United States Patent
Okada et al.

(10) Patent No.: US 10,184,585 B2
(45) Date of Patent: Jan. 22, 2019

(54) ELECTROMAGNETIC VALVE

(71) Applicants: DENSO CORPORATION, Kariya, Aichi-pref. (JP); DENSO KOREA AUTOMOTIVE CORPORATION, Changwon-si, Gyeongsangnam-do (KR)

(72) Inventors: Keita Okada, Kariya (JP); Masahiro Tomita, Kariya (JP); Sanghun Lee, Changwon (KR); Jaehun Jeong, Kimhae (KR)

(73) Assignees: DENSO CORPORATION, Kariya (JP); DENSO KOREA AUTOMOTIVE CORPORATION, Changwon-si (KR)

( * ) Notice: Subject to any disclaimer, the term of this patent is extended or adjusted under 35 U.S.C. 154(b) by 71 days.

(21) Appl. No.: 15/372,834

(22) Filed: Dec. 8, 2016

(65) Prior Publication Data

US 2017/0167626 A1    Jun. 15, 2017

(30) Foreign Application Priority Data

Dec. 10, 2015 (JP) ................... 2015-241507

(51) Int. Cl.
- *F16K 31/06* (2006.01)
- *G05D 16/20* (2006.01)
- *H01F 5/04* (2006.01)
- *H01F 7/06* (2006.01)

(52) U.S. Cl.
CPC ...... *F16K 31/0675* (2013.01); *F16K 31/0613* (2013.01); *G05D 16/2013* (2013.01); *H01F 5/04* (2013.01); *H01F 2005/043* (2013.01); *H01F 2007/062* (2013.01)

(58) Field of Classification Search
CPC .... F16K 31/0675; F16K 31/0613; H01F 5/02; H01F 5/04; H01F 2005/043; H01F 2007/062
USPC ....... 336/192, 198, 199, 196, 185, 209, 208, 336/219; 335/282, 299
See application file for complete search history.

(56) References Cited

U.S. PATENT DOCUMENTS

| | | | |
|---|---|---|---|
| 6,033,189 A | 3/2000 | Miura et al. | |
| 6,369,682 B1* | 4/2002 | Thompson, Jr. ...... | F02M 51/005 336/192 |
| 8,253,524 B2* | 8/2012 | Nomura ................ | H01F 41/127 242/416 |
| 9,746,097 B1* | 8/2017 | Ishii ......................... | H01F 7/20 |
| 2015/0332841 A1* | 11/2015 | Hasegawa ................ | H01F 5/00 307/104 |

(Continued)

FOREIGN PATENT DOCUMENTS

| JP | 8-40694 | 2/1996 |
|---|---|---|
| JP | 5167060 | 3/2013 |

*Primary Examiner* — Ian Paquette
(74) *Attorney, Agent, or Firm* — Nixon & Vanderhye PC

(57) ABSTRACT

An electromagnetic valve includes a movable valve, and an electromagnetic solenoid. The electromagnetic solenoid has a bobbin including a body part, a flange part in which a recess portion is defined to recess inward in a radial direction, and an extension part extending at a position between the flange part and the body part to connect a bottom surface of the recess portion to a body surface of the body part. The extension part has a projection projected outward in the radial direction from a position between the body part and a connection part connecting a winding wire to a terminal part.

10 Claims, 3 Drawing Sheets

(56) References Cited

U.S. PATENT DOCUMENTS

2017/0309383 A1* 10/2017 Watanabe .......... F16K 31/0675

* cited by examiner

ELECTROMAGNETIC VALVE

CROSS REFERENCE TO RELATED APPLICATION

This application is based on Japanese Patent Application No. 2015-241507 filed on Dec. 10, 2015, the disclosure of which is incorporated herein by reference in its entirety.

TECHNICAL FIELD

The present disclosure relates to an electromagnetic valve.

BACKGROUND

An electromagnetic valve has an electromagnetic solenoid that drives a movable valve to control pressure of fluid. JP 5167060 B2 describes an electromagnetic solenoid for such an electromagnetic valve, and the electromagnetic solenoid has a wire and a bobbin. The wire has a winding covered with an insulation film. The bobbin has a body part and a flange part. The winding is wound around the body part. The flange part is projected from the body part, and regulates a displacement of the winding.

A corner portion between the body part and the flange part integrally has a ridge part extending around the body part. When the winding is wound along a first end to a second end of the ridge part, the winding is in press-contact to a base of the ridge part, such that the winding wire can be aligned in the tightly contact state.

SUMMARY

However, a connection part connected with the most inner layer of the winding may interfere with a part of the winding extending from a radially outer side of the bobbin to the ridge part. If the interference is repeated by vibration applied to the electromagnetic valve, the insulation film of the wire may be damaged.

It is an object of the present disclosure to provide an electromagnetic valve in which an insulation film of a wire is restricted from being damaged.

According to an aspect of the present disclosure, an electromagnetic valve includes a movable valve, and an electromagnetic solenoid that drives the movable valve to control a pressure of fluid. The electromagnetic solenoid has a winding wire covered with an insulation film, and a bobbin. The winding wire has a connection part that connects the winding wire to a terminal part. The bobbin includes: a body part around which the winding wire is wound to define a plurality of layers; a flange part projected from the body part outward in a radial direction to regulate a displacement of the winding wire, the flange part having a recess portion recessed inward in the radial direction to guide the connection part to the body part, the recess portion having a bottom surface being located on an outer side of a body surface of the body part in the radial direction; and an extension part extending to intersect an axial direction at a position between the flange part and the body part to connect the bottom surface of the recess portion to the body surface of the body part, the extension part guiding the connection part from the recess portion to a most inner layer of the winding wire. The extension part has a projection projected outward in the radial direction from a position between the body part and the connection part extending along the extension part.

Accordingly, the connection part can be guided to the body part by the recess portion of the flange part recessed inward in the radial direction and passing through the flange part in the axial direction (thickness direction). Since the connection part extends to intersect the axial direction at a position between the flange part and the body part, the connection part is made to crawl along the extension part which connects the bottom surface of the recess portion to the body surface of the body part located on the radially inner side than the bottom surface of the recess portion. The projection projected outward in the radial direction is defined at the position between the body part and the connection part extending along the extension part. Therefore, when the connection part is guided to the most inner layer of the winding wire through the extension part from the recess portion, the connection part which crawls along the extension part can be restricted from being displaced toward the winding wire wound around the body part to have plural layers. Thereby, the connection part becomes difficult to interfere with the winding wire, and the insulation film of the winding wire is restricted from being damaged.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

An embodiment is described based on FIGS. 1-6.

Figure 1:
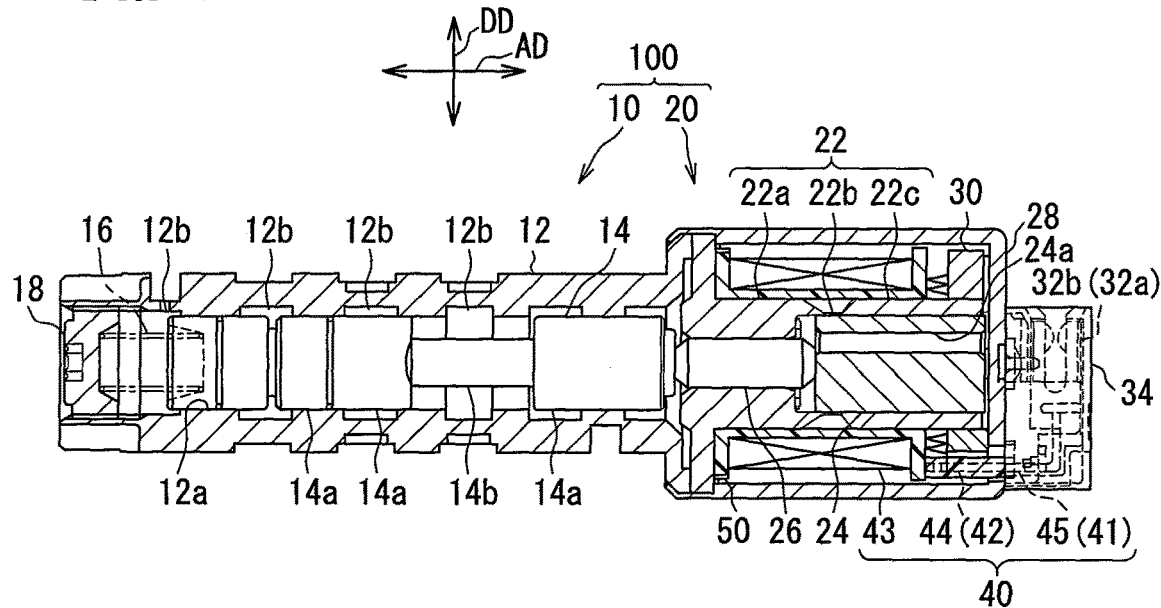
FIG. 1 is a schematic sectional view illustrating an electromagnetic valve according to an embodiment.

An electromagnetic valve 100 according to the embodiment is mounted in a vehicle and is used in, for example, a hydraulic system of an automatic speed shift device. As shown in FIG. 1, the electromagnetic valve 100 includes a movable valve 10 and an electromagnetic solenoid 20. The electromagnetic solenoid 20 drives the movable valve 10 to control pressure of oil as fluid.

The movable valve 10 is a spool valve having a sleeve 12, a spool 14, a spring 16, and a stopper 18.

The sleeve 12 has an approximately cylinder shape and is made of, for example, nonmagnetic metal material such as aluminum alloy. The sleeve 12 has an axial hole 12*a* passing through in an axial direction AD, and plural oil ports 12*b* (radial holes) passing through the outer wall of the sleeve 12 in a radial direction DD from the axial hole 12*a*. The oil ports 12*b* are an inlet port, an exit port, a discharge port, and a respiratory port.

The spool 14 is held in the axial hole 12*a* of the sleeve 12 to be able to slide. The spool 14 has lands 14*a* defining the oil ports 12*b*, and a small diameter part 14*b* between the lands 14*a*. The spool 14 changes the opening position of the oil ports 12*b* according to the relative position in the axial direction AD relative to the sleeve 12, such that the oil ports 12b can be changed between a communication state and an interception state.

The spring 16 is a compression coil spring arranged between the stopper 18 and an end of the spool 14 opposite to the electromagnetic solenoid 20. The stopper 18 is arranged at an end of the sleeve 12 opposite to the electromagnetic solenoid 20. The spring 16 is able to bias the spool 14 toward the electromagnetic solenoid 20 in the axial direction AD.

The electromagnetic solenoid 20 has a stator core 22, a plunger 24, a shaft 26, a yoke 28, a ring core 30, a pair of terminals 32a and 32b, a wire 40, and a bobbin 50.

The stator core 22 has an approximately pillar shape, as a whole, and is made of magnetic metal material such as iron. The stator core 22 integrally has a magnetic suction core 22a, a magnetic cutoff section 22b, and a guidance core 22c.

The plunger 24 has an approximately pillar shape and is made of magnetic metal material such as iron. The plunger 24 is arranged in the inner circumference part of the guidance core 22c, and is able to reciprocate in the axial direction AD. The plunger 24 has a respiratory pore 24a passing through in the axial direction AD.

The shaft 26 is supported by the inner circumference part of the magnetic suction core 22a and is able to slide in the axial direction AD, and is arranged between the spool 14 and the plunger 24. Since the spring 16 biases the spool 14 toward the electromagnetic solenoid 20, the end of the shaft 26 adjacent to the spool 14 is in contact with the spool 14, and the end of the shaft 26 adjacent to the plunger 24 is in contact with the plunger 24.

The yoke 28 is made of magnetic metal material such as iron, and has a based approximately cylindrical shape. The yoke 28 receives the stator core 22, the ring core 30, and the bobbin 50. The yoke 28 fixes the stator core 22 and the sleeve 12. In this way, the yoke 28 and the stator core 22 are combined magnetically.

The ring core 30 is annularly formed and is made of magnetic metal material such as iron. The ring core 30 surrounds the stator core 22 that surrounds the plunger 24 from the radially outer side, and is in contact with the bottom of the yoke 28. Thereby, the ring core 30 assists the magnetic combination between the yoke 28 and the stator core 22.

The pair of terminals 32a and 32b is made of conductive material. A part of the terminal 32a, 32b is exposed from a connector area 34 projected at the end opposite from the movable valve 10 through the bobbin 50. The terminal 32a, 32b is electrically connected with a control device including a power supply outside of the electromagnetic solenoid 20.

The wire 40 is an electric wire having a circular cross-section, and integrally has a winding wire 43, a pair of terminal parts 41 and 45, and a pair of connection parts 42 and 44. The winding wire 43 and the connection part 42, 44 are made of a lead covered with an insulation film. The terminal part 41, 45 is each end of the wire 40, and the lead is exposed from the insulation film. Potting may be carried out to the terminal part 41, 45 by synthetic resin. The lead is made of copper.

The winding wire 43 is wound around the body part 52 to define plural layers. The terminal part 41 is electrically connected to the terminal 32a, and the terminal part 45 is electrically connected to the terminal 32b.

The connection part 42 connects the terminal part 41 to the winding wire 43 corresponding to a most inner layer 43a. The connection part 44 connects the terminal part 45 to the winding wire 43 corresponding to a most outer layer 43b.

The wire 40 is arranged, for example, by being injected like thread of a spider from a nozzle of a spooling machine by operation of the position of the nozzle relative to the bobbin 50. In this embodiment, the terminal part 41 and connection part 42 are the start side, and the connection part 44 and the terminal part 45 are the end side.

As shown in FIGS. 2-6, the bobbin 50 is made of, for example, synthetic resin, and has the shape of approximately cylinder surrounding the stator core 22 from the radially outer side. The bobbin 50 has the body part 52, the flange parts 54 and 55, a recess portion 56, an extension part 58, and a projection 60.

Figure 4:
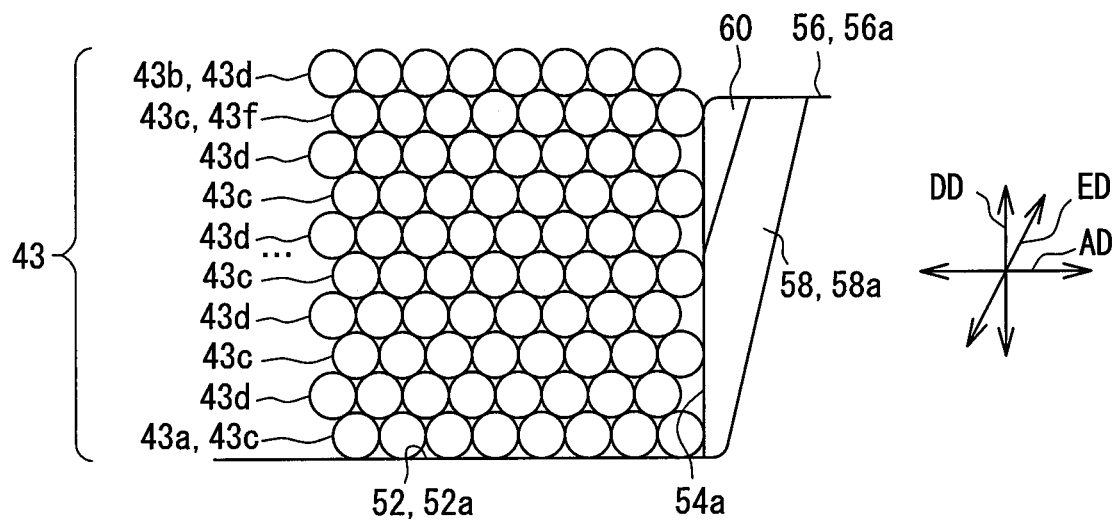
FIG. 4 is a diagram for explaining the winding wire wound around the bobbin.

The body part 52 has a cylindrical shape with a cylindrical body surface 52a all the circumferences. The winding wire 43 is wound around the body part 52 to have plural layers. As shown in FIG. 4, in this embodiment, the winding wire 43 is wound to have, for example, ten layers. The plural layers are constructed by alternately odd layers 43c and even layers 43d counted from the radially inner side. The center of the wire 40 is shifted by the radius of the wire 40 between the odd layer 43c and the even layer 43d in the axial direction AD. Therefore, the wire 40 on the radially outer side is fitted into the valley part formed between the wires 40 on the radially inner side.

Figure 2:
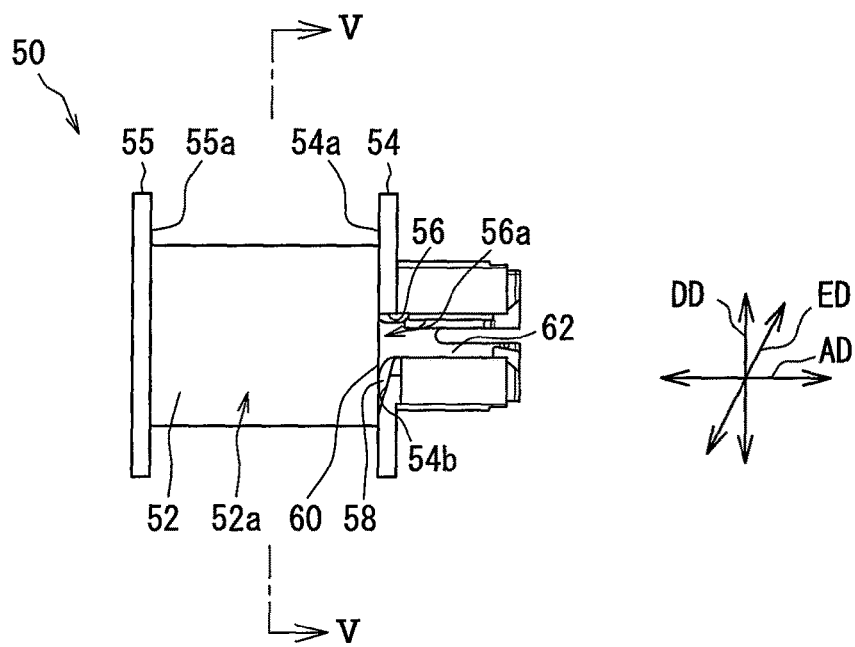
FIG. 2 is a view illustrating a bobbin of the electromagnetic valve.

As shown in FIG. 2, the flange parts 54 and 55 are defined respectively at both sides of the body part 52 in the axial direction AD. Each of the flange parts 54, 55 has a ring shape covering all the circumferences, and is projected outward in the radial direction from the body surface 52a of the body part 52. The flange part 54, 55 has a regulation wall 54a, 55a facing the body part 52 and extending substantially perpendicularly to the axial direction AD. Since the regulation wall 54a, 55a is in contact with the winding wire 43, the displacement of the winding wire 43 in the axial direction AD is regulated.

As shown in FIG. 4, the odd layer 43c of the winding wire 43 defines a contact layer in contact with the regulation wall 54a of the flange part 54 in the axial direction AD. A clearance is defined between the even layer 43d and the regulation wall 54a by the radius of the wire 40, while the center of the wire 40 is shifted by approximately the radius relative to the odd layer 43c which is the contact layer. The even layer 43d located the most outer side in the radial direction defines a most outer layer 43b of the winding wire 43.

As shown in FIGS. 2, 3, 5, and 6, the recess portion 56 is defined in the flange part 54 adjacent to the connector area 34 (adjacent to the terminal 32a, 32b). The recess portion 56 passing through the flange part 54 in the axial direction AD (the thickness direction of the flange part 54), and is recessed inward in the radial direction from an outermost circumference of the flange part 54. The bottom surface 56a of the recess portion 56 is located on the radially outer side of the body surface 52a of the body part 52. Furthermore, the bottom surface 56a of the recess portion 56 is flush with a bottom surface 62a of a long groove portion 62 defined on a side of the bobbin 50 opposite from the body part 52 to extend in the axial direction AD. The bottom surface 56a directly continues from the bottom surface 62a of the long groove portion 62.

Figure 3:
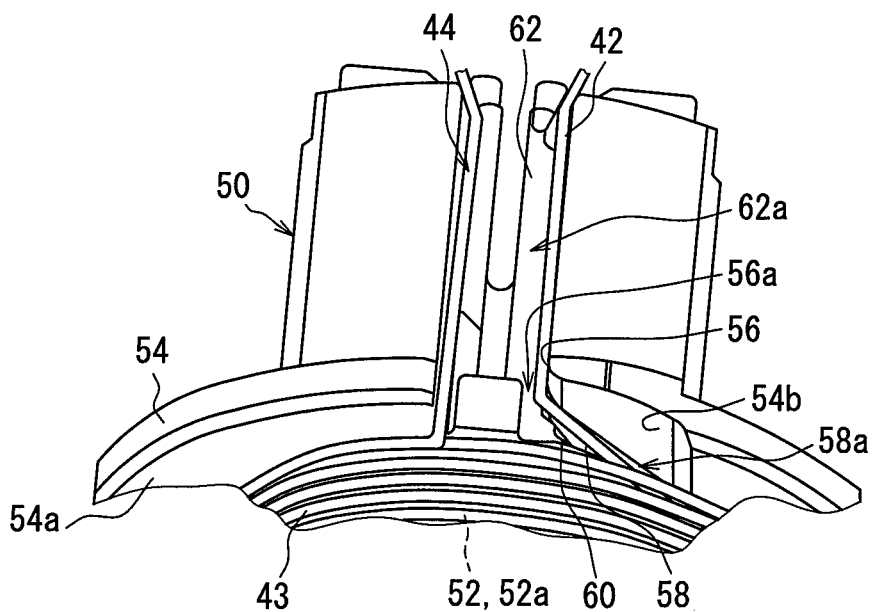
FIG. 3 is an enlarged perspective view illustrating the bobbin and a winding wire of the electromagnetic valve.

As shown in FIG. 3, the connection part 42 connects the terminal part 41 connected with the terminal 32a to the winding wire 43, and is made to crawl along the bottom surface 62a between the terminal 32a and the recess portion 56, and passes through the recess portion 56. In this way, the recess portion 56 guides the connection part 42 from the terminal 32a toward the body part 52. On the other hand, the recess portion 56 guides the connection part 44 from the most outer layer 43b of the winding wire 43 toward the terminal 32b by passing through the recess portion 56.

The extension part 58 is defined in a space between the body part 52 and the flange part 54 adjacent to the connector area 34, and extends a part of the space in the circumferential direction. The extension part 58 extends in the extension direction ED intersecting the axial direction AD, and connects the bottom surface 56a of the recess portion 56 to the body surface 52a of the body part 52. Specifically, the extension part 58 has a slope surface 58a which intersects the axial direction AD. The slope surface 58a has a plane shape which declines from an outer side to an inner side in the radial direction and which intersects the radial direction DD. Thus, the bottom surface 56a of the recess portion 56 and the body surface 52a which have a vertical interval in the radial direction DD are connected with each other.

The flange part 54 defines an erected wall 54b on a side of the slope surface 58a adjacent to the flange part 54, since the flange part 54 is projected outward in the radial direction from the slope surface 58a. The flange part 54 defines the regulation wall 54a on a side of the slope surface 58a adjacent to the body part 52. The regulation wall 54a extends inward in the radial direction from the slope surface 58a. The erected wall 54b extends toward the body part 52, as the slope surface 58a declines toward the body surface 52a in the extension direction ED, such that the width of the slope surface 58a is reduced in the axial direction AD.

As shown in FIG. 3, in this way, the extension part 58 is guided to the most inner layer 43a of the winding wire 43 because the connection part 42 extends from the recess portion 56 along the slope surface 58a. Specifically, the connection part 42 passes through the recess portion 56 in the axial direction AD and changes the extending direction to and along the extension direction ED of the extension part 58. The connection part 42 extends along the erected wall 54b on the side of the slope surface 58a adjacent to the flange part 54. In this way, the connection part 42 is guided to the most inner layer 43a of the winding wire 43 in contact with the body surface 52a located on the radially inner side of the bottom surface 56a of the recess portion 56.

When electric power is supplied to the winding wire 43 through the terminal parts 41, 45 and the connection parts 42, 44, a magnetic circuit is formed to pass the stator core 22, the yoke 28, and the plunger 24. Then, the plunger 24 is attracted to the magnetic suction core 22a of the stator core 22, and the spool 14 is driven toward the stopper 18 through the shaft 26.

The projection 60 is projected outward in the radial direction from the extension part 58 at a position between the body part 52 and the connection part 42. In detail, the projection 60 is projected at a position between the bottom surface 56a of the recess portion 56 and a middle point of the slope surface 58a in the extension direction ED. The projection 60 has an inclination ridgeline part 60a, a width reduction part 60b, and a curved surface part 60c.

Figure 5:
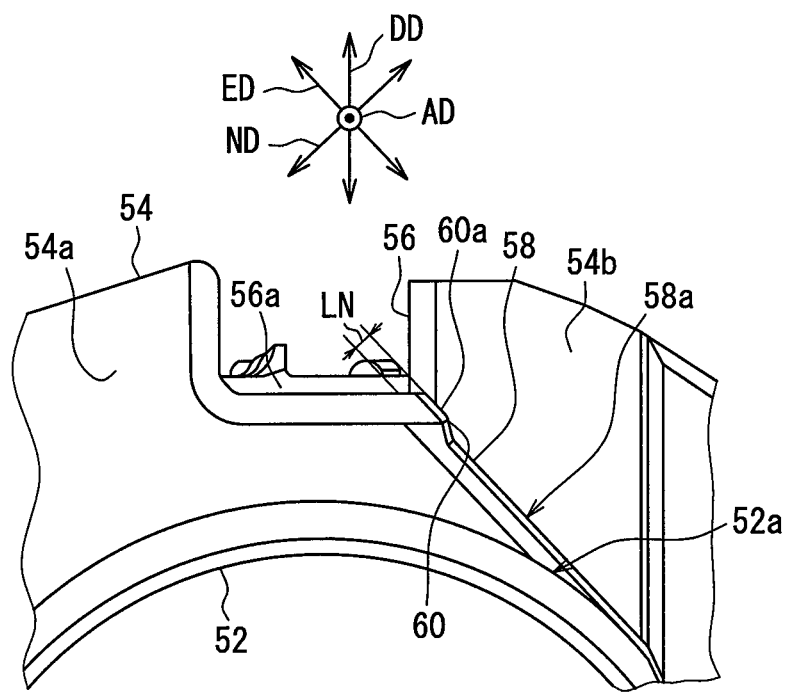
FIG. 5 is an enlarged side view seen in a direction V of FIG. 2.

The inclination ridgeline part 60a is formed at the tip end part of the projection 60. As shown in FIG. 5, the inclination ridgeline part 60a has the shape of a ridgeline which declines according to the gradient of the slope surface 58a. The dimension LN from the slope surface 58a to the tip end part of the projection 60 in the normal direction ND to the slope surface 58a, that is, the dimension LN from the slope surface 58a to the inclination ridgeline part 60a is larger than the radius of the wire 40. Further, the dimension LN is smaller than the diameter of the wire 40. Moreover, an end of the inclination ridgeline part 60a adjacent to the bottom surface 56a of the recess portion 56 is located on the radially inner side of the bottom surface 56a of the recess portion 56.

The projection 60 is projected within a range on the radially inner side of the bottom surface 56a of the recess portion 56. As shown in FIG. 3, the projection 60 faces the most outer contact layer 43f in the axial direction AD. The most outer contact layer 43f is the odd layer located the most outer side among the odd layers 43c as the contact layer. In other words, the projection 60 and the most outer contact layer 43f are arranged at the same height position from the body surface 52a.

Figure 6:
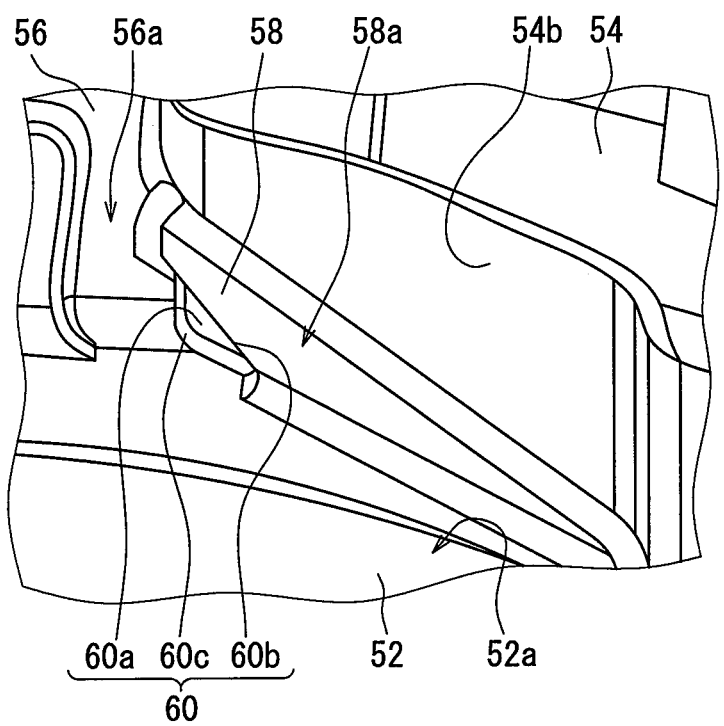
FIG. 6 is an enlarged perspective view illustrating a projection of the bobbin.

As shown in FIG. 6, the width reduction part 60b is a part of the projection 60 located adjacent to the body surface 52a in the extension direction ED. The width of the width reduction part 60b in the axial direction AD is reduced, as going toward the body surface 52a, according to the width reduction of the slope surface 58a. When the width reduction part 60b of the projection 60 is seen from the outer side to the inner side in the radial direction, the width reduction part 60b has approximately triangle shape. Moreover, the curved surface part 60c is a part of the projection 60 adjacent to the body part 52 in the axial direction AD, and has a curved shape such as a convex protruding toward the body part 52.

Advantages obtained in this embodiment are explained below.

According to this embodiment, the connection part 42 is guided toward the body part 52 by the recess portion 56 recessed inward in the flange part 54 in the radial direction and passing through the flange part 54 in the axial direction. The connection part 42 is located between the flange part 54 and the body part 52, and extends to intersect the axial direction AD. The connection part 42 is made to crawl along the extension part 58 which connects the bottom surface 56a of the recess portion 56 to the body surface 52a of the body part 52 located on the inner side of the bottom surface 56a of the recess portion 56 in the radial direction.

The projection 60 projected outward in the radial direction is arranged between the body part 52 and the connection part 42 disposed along the extension part 58. Therefore, while the connection part 42 is guided to the most inner layer 43a of the winding wire 43 through the extension part 58 from the recess portion 56, the connection part 42 which crawls on the extension part 58 can be restricted from being displaced toward the winding wire 43 wound around the body part 52. Thereby, the connection part 42 becomes difficult to interfere with the winding wire 43, and the insulation film of the wire 40 can be restricted from being damaged.

According to this embodiment, the projection 60 is projected within a range on the radially inner side of the bottom surface 56a of the recess portion 56. Since the projection 60 does not project toward the bottom surface 56a of the recess portion 56, when arranging the connection part 42 on the recess portion 56 and the extension part 58, the connection part 42 can be restricted from contacting to the projection 60. Therefore, the connection part 42 can be easily arranged, and the insulation film can be restricted from being damaged at the connection part 42.

According to this embodiment, the projection 60 opposes the most outer contact layer 43f in the axial direction AD. The most outer contact layer 43f is located on the most outer side in the radial direction, and is in contact with the flange part 54 in the axial direction AD. Therefore, the most outer contact layer 43f becomes difficult to be displaced toward the connection part 42 with respect to the projection 60, and interference between the connection part 42 and the winding wire 43 can be restricted.

Furthermore, while the most outer layer 43b is defined on the radially outer side of the most outer contact layer 43f, in which the center of the wire 40 is shifted by the radius in the axial direction AD, when arranging the connection part 42 on the recess portion 56 and the extension part 58, the connection part 42 can be restricted from contacting the projection 60. Therefore, the connection part 42 can be easily arranged, and damage of the insulation film can be controlled at the connection part 42.

According to this embodiment, the extension part 58 has the slope surface 58a which declines from the radially outer side to the radially inner side, while intersecting the radial direction DD. The connection part 42 can be stable on and along the slope surface 58a. In this way, the connection part 42 can be guided to the most inner layer 43a of the winding wire 43 while the displacement of the connection part 42 can be restricted.

According to this embodiment, the dimension LN from the slope surface 58a to the tip end part of the projection 60 is larger than the radius of the wire 40. Therefore, since the center of the connection part 42 disposed along the slope surface 58a can be arranged on the radially inner side of the tip end part of the projection 60, the connection part 42 becomes more difficult to shift toward the body part 52 with respect to the projection 60. In this way, the connection part 42 becomes difficult to interfere with the winding wire 43, and the insulation film of the wire 40 is restricted from being damaged.

According to this embodiment, the projection 60 has the inclination ridgeline part 60a inclined in accordance with the inclination of the slope surface 58a. Due to the inclination, the connection part 42 can be easily arranged along the slope surface 58a, and the connection part 42 extending along and on the slope surface 58a can be separated from the winding wire 43.

According to this embodiment, the projection 60 has the curved surface part 60c curved in the shape of a convex protruding toward the body part 52. Due to the curved shape, even if the winding wire 43 and the projection 60 are in contact with each other, the insulation film of the winding wire 43 can be restricted from being damaged.

Other Embodiment

As a first modification, the even layer 43d may define the contact layer that is in contact with the flange part 54 in the axial direction AD, and the odd layer 43c located on the most outer side may define the most outer layer 43b.

As a second modification, the projection 60 may be projected on the radially outer side of the most outer contact layer 43f.

As a third modification, the projection 60 may be projected on the radially outer side of the bottom surface 56a of the recess portion 56.

As a fourth modification, the connector area 34 from which a part of the terminal 32a, 32b is exposed may be formed at the other position, for example, on the radially outer side of the yoke 28.

As a fifth modification, the recess portion 56, the extension part 58, and the projection 60 may be formed, for example, on the flange part 55 adjacent to the movable valve 10, in accordance with the position of the connector area 34.

As a sixth modification, the slope surface 58a may be a curved surface.

As a seventh modification, the present disclosure may be applied to an electromagnetic valve which controls pressure of fluid other than oil, such as fuel.

Such changes and modifications are to be understood as being within the scope of the present disclosure as defined by the appended claims.

What is claimed is:

1. An electromagnetic valve comprising:
   a movable valve; and
   an electromagnetic solenoid that drives the movable valve to control a pressure of fluid, wherein the electromagnetic solenoid has
      a winding wire covered with an insulation film, the winding wire having a connection part that connects the winding wire to a terminal part, and
      a bobbin including
         a body part around which the winding wire is wound to define a plurality of layers,
         a flange part projected from the body part outward in a radial direction to regulate a displacement of the winding wire, the flange part having a recess portion recess inward in the radial direction to guide the connection part to the body part, the recess portion having a bottom surface being located on an outer side of a body surface of the body part in the radial direction, and
         an extension part extending to intersect an axial direction at a position between the flange part and the body part to connect the bottom surface of the recess portion to the body surface of the body part, the extension part guiding the connection part from the recess portion to a most inner layer of the winding wire, wherein:
   the extension part has a projection projected outward in the radial direction from a position between the body part and the connection part extending along the extension part;
   the plurality of layers is constructed by odd layers and even layers counted from an inner circumference side,
   the winding wire is wound in a state where a center of the winding wire is shifted by a radius of the winding wire in the axial direction between the odd layer and the even layer,
   one of the odd layer and the even layer defines a contact layer in contact with the flange part in the axial direction,
   the other of the odd layer and the even layer located on a most outer side in the radial direction defines a most outer layer, and
   the projection faces one of the contact layers in the axial direction, the one of the contact layers being located on a most outer side in the radial direction.

2. The electromagnetic valve given in claim 1, wherein the projection is projected within a range on an inner side of the bottom surface of the recess portion in the radial direction.

3. The electromagnetic valve according to claim 1, wherein
   the projection has a curved surface part which curves in a convex shape protruding toward the body part.

4. The electromagnetic valve according to claim 1, further comprising:
   a terminal electrically connected to an exterior of the electromagnetic solenoid, wherein
   the terminal part is connected to the terminal, and has a lead exposed from the insulation film.

5. An electromagnetic valve comprising:
a movable valve; and
an electromagnetic solenoid that drives the movable valve to control a pressure of fluid, wherein the electromagnetic solenoid has
    a winding wire covered with an insulation film, the winding wire having a connection part that connects the winding wire to the terminal part, and
    a bobbin including
        a body part around which the winding wire is wound to define a plurality of layers,
        a flange part projected from the body part outward in a radial direction to regulate a displacement of the winding wire, the flange part having a recess portion recessed inward in the radial direction to guide the connection part to the body part, the recess portion having a bottom surface being located on an outer side of a body surface of the body part in the radial direction, and
        an extension part extending to intersect an axial direction at a position between the flange part and the body part to connect the bottom surface of the recess portion to the body surface of the body part, the extension part guiding the connection part from the recess portion to a most inner layer of the winding wire, wherein:
the extension part has a projection projected outward in the radial direction from a position between the body part and the connection part extending along; the extension part;
the extension part has a slope surface intersecting the radial direction and declining from an outer side to an inner side in the radial direction, and
the connection part extends along the slope surface.

6. The electromagnetic valve given in claim 5, wherein the projection is projected within a range on an inner side of the bottom surface of the recess portion in the radial direction.

7. The electromagnetic valve according to claim 5, wherein
a dimension from the slope surface to a tip end of the projection in a normal direction of the slope surface is larger than a radius of the winding wire.

8. The electromagnetic valve according to claim 5, wherein
the projection has an inclination ridgeline part inclines in accordance with a gradient of the slope surface.

9. The electromagnetic valve according to claim 5, wherein
the projection has a curved surface part which curves in a convex shape protruding toward the body part.

10. The electromagnetic valve according to claim 5, further comprising:
a terminal electrically connected to an exterior of the electromagnetic solenoid, wherein
the terminal part is connected to the terminal, and has a lead exposed from the insulation film.

\* \* \* \* \*